United States Patent
Fukuyama

(10) Patent No.: US 9,558,395 B2
(45) Date of Patent: Jan. 31, 2017

(54) IMAGE CORRECTION DEVICE, IMAGE CORRECTION METHOD, AND IMAGING DEVICE

(71) Applicant: SONY CORPORATION, Minato-ku (JP)

(72) Inventor: Masato Fukuyama, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 58 days.

(21) Appl. No.: 14/601,832

(22) Filed: Jan. 21, 2015

(65) Prior Publication Data
US 2015/0229818 A1 Aug. 13, 2015

(30) Foreign Application Priority Data
Feb. 10, 2014 (JP) .................................. 2014-023040

(51) Int. Cl.
| | |
|---|---|
| G06K 9/00 | (2006.01) |
| H04N 5/235 | (2006.01) |
| H04N 5/243 | (2006.01) |
| H04N 5/353 | (2011.01) |
| H04N 5/355 | (2011.01) |

(52) U.S. Cl.
CPC ........ *G06K 9/00228* (2013.01); *H04N 5/2354* (2013.01); *H04N 5/243* (2013.01); *H04N 5/3532* (2013.01); *H04N 5/35572* (2013.01)

(58) Field of Classification Search
None
See application file for complete search history.

(56) References Cited

U.S. PATENT DOCUMENTS

| | | | | |
|---|---|---|---|---|
| 2011/0317029 A1* | 12/2011 | Fukui | ................. | H04N 5/2354 348/224.1 |
| 2012/0188403 A1* | 7/2012 | Gomita | ................ | H04N 5/2354 348/226.1 |
| 2014/0152867 A1* | 6/2014 | Shirakawa | ......... | H04N 5/23232 348/226.1 |

(Continued)

FOREIGN PATENT DOCUMENTS

| | | |
|---|---|---|
| JP | 2007306225 A | * 11/2007 |
| JP | 2010-135921 | 6/2010 |
| JP | 2012-156634 A | 8/2012 |

*Primary Examiner* — Timothy J Henn
*Assistant Examiner* — Quan Pham
(74) *Attorney, Agent, or Firm* — Oblon, McClelland, Maier & Neustadt, L.L.P.

(57) ABSTRACT

There is provided an image correction device including a flash band detection unit configured to detect a flash band, the flash band being a step occurred between levels for respective lines in a frame by a flash of light, the step being occurred by a difference in exposure time between the lines of a video signal output for each frame from pixels included in a rolling shutter image sensor, a shutter operation determination unit configured to determine whether or not shutter operation has been performed in an imaging device including the image sensor, and a flash band correction unit configured to, when the shutter operation determination unit determines that shutter operation has been performed and the flash band detection unit has detected the flash band, output a video signal of a previous frame output from the image sensor earlier than a frame containing the detected flash band.

11 Claims, 13 Drawing Sheets

(56) References Cited

U.S. PATENT DOCUMENTS

| | | | |
|---|---|---|---|
| 2014/0198229 A1* | 7/2014 | Morimoto | H04N 5/23219 348/211.8 |
| 2014/0232908 A1* | 8/2014 | Kishida | H04N 5/2173 348/241 |

* cited by examiner

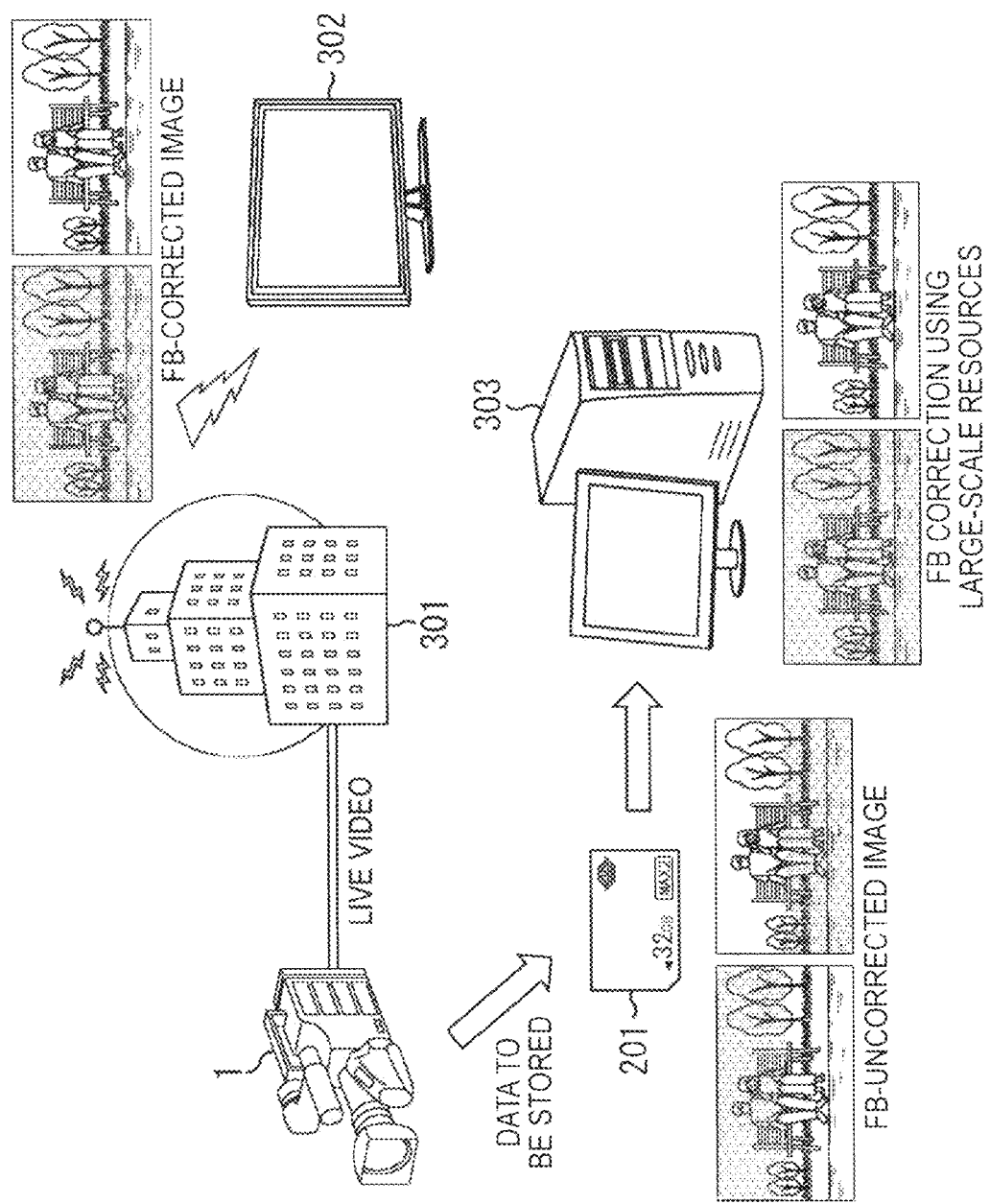

IMAGE CORRECTION DEVICE, IMAGE CORRECTION METHOD, AND IMAGING DEVICE

CROSS REFERENCE TO RELATED APPLICATIONS

This application claims the benefit of Japanese Priority Patent Application JP 2014-023040 filed Feb. 10, 2014, the entire contents of which are incorporated herein by reference.

BACKGROUND

The present technology relates to image correction devices, image correction methods, and imaging devices. More particularly, the present technology relates to an image correction device, image correction method, and imaging device which are capable of removing a flash band which occurs in the case of shutter operation.

In the related art, some image sensors for use in a camera employ rolling shutter, which is a technique of successively starting exposure on a horizontal line-by-horizontal line basis, and successively reading out a video signal on a horizontal line-by-horizontal line basis, to generate a frame. In the rolling shutter image sensor, the lines have different exposure times.

Therefore, if a flash, etc., is fired during a period of time which is short compared to a frame rate at which the image sensor reads out a video signal, an abrupt change or step may occur in the luminance level of a video which is displayed based on a read video signal in a frame, which causes a band-like pattern (hereinafter referred to as "flash band"). Note that, in the description that follows, the term "flash band" may be abbreviated to "FB."

JP 2010-135921A discloses a technique of reducing or preventing a degradation in image quality which is caused by a flash of light emitted by cameras possessed by others when a through-the-lens image or moving image is captured using the rolling shutter technique. The present applicant has previously proposed a flash band detection circuit for detecting a flash band which occurs in a video which is captured by illuminating a subject using a flash (see, for example, JP 2012-156634A).

SUMMARY

Incidentally, in the technique of JP 2010-135921A, when a high luminance area has been detected, the last frame in which a high luminance area has not been detected is successively output until no image containing a high luminance area is output, whereby an unnatural through-the-lens image or moving image is reduced or prevented. However, in this technique, the same frame is successively output, and therefore, when a video of a moving subject is captured, the video appears to stop for a moment.

Such a phenomenon occurring in JP 2010-135921A above that when a video of a moving subject is captured, the video appears to stop for a moment can be reduced or avoided by detecting a flash band using the technique of JP 2012-156634A and correcting the detected flash band. However, this technique has a problem that when shutter operation is performed, a flash band cannot be corrected. Therefore, there has been a demand for removal of a flash band which occurs even in the case of shutter operation.

Under these circumstances in mind, the present technology has been made to remove a flash band which occurs in the case of shutter operation.

An image correction device according to the first aspect of the present technology includes a flash band detection unit configured to detect a flash band, the flash band being a step occurred between levels for respective lines in a frame by a flash of light, the step being occurred by a difference in exposure time between the lines of a video signal output for each frame from pixels included in a rolling shutter image sensor, a shutter operation determination unit configured to determine whether or not shutter operation has been performed in an imaging device including the image sensor, and a flash band correction unit configured to, when the shutter operation determination unit determines that shutter operation has been performed and the flash band detection unit has detected the flash band, output a video signal of a previous frame output from the image sensor earlier than a frame containing the detected flash band.

The flash band correction unit may output, in a first frame output immediately after an end of the flash band, a video signal contained in a frame output by the image sensor immediately after the end of the flash band, and may output, in a second frame output following the first frame, a video signal calculated based on the video signal of the frame immediately after the end of the flash band and a video signal of a frame output by the image sensor following the frame immediately after the end of the flash band.

When the shutter operation determination unit determines that shutter operation has not been performed and the flash band detection unit has detected the flash band, the flash band correction unit may output, in a first frame output immediately after the detection of the flash band, a video signal of a previous frame output from the image sensor earlier than the frame containing the detected flash band, and outputs, in a second frame output following the first frame, a video signal calculated based on the video signal of the frame containing the detected flash band and a video signal of a frame output by the image sensor following the frame containing the detected flash band.

The flash band detection unit may set a plurality of frames for detecting the flash band.

The flash band detection unit may dynamically change a setting of a frame for detecting the flash band.

The flash band detection unit may change the setting of the frame for detecting the flash band, based on detection information of a subject in the imaging device.

The detection information of the subject may be face detection information of the subject.

The flash band correction unit may determine whether or not the flash band correction is to be performed, based on a purpose of use of the video signal.

The image correction device may further include a recording output unit configured to output a video signal which has not been corrected by the flash band correction unit to a recording medium.

The image correction device according to the first aspect of the present technology may be a separate device or may be an internal block included in a single device.

An image correction method according to the first aspect of the present technology is one which corresponds to the image correction device according to the first aspect of the present technology.

In the image correction device and the image correction method according to the first aspect of the present technology, a flash band is detected, the flash band being a step occurred between levels for respective lines in a frame by a flash of light, the step being occurred by a difference in exposure time between the lines of a video signal output for each frame from pixels included in a rolling shutter image sensor, whether or not shutter operation has been performed in an imaging device including the image sensor is determined, and, when determining that shutter operation has been performed and the flash band has been detected, a video signal of a previous frame output from the image sensor earlier than a frame containing the detected flash band is output.

An imaging device according to a second aspect of the present technology includes an imaging unit including a rolling shutter image sensor, a flash band detection unit configured to detect a flash band, the flash band being a step occurred between levels for respective lines in a frame by a flash of light, the step being occurred by a difference in exposure time between the lines of a video signal output for each frame from pixels included in the image sensor, and a flash band correction unit configured to correct the flash band. When the imaging unit has performed shutter operation and the flash band detection unit has detected the flash band, the flash band correction unit outputs a video signal of a previous frame output from the image sensor earlier than a frame containing the detected flash band.

The imaging device may further includes a first output unit configured to output a video signal corrected by the flash band correction unit, and a second output unit configured to output a video signal which has not been corrected by the flash band correction unit.

The imaging device according to the second aspect of the present technology may be a separate device or may be an internal block included in a single device.

In the imaging device according to the second aspect of the present technology, when shutter operation has been performed in the imaging unit including the rolling shutter image sensor and a flash band has been detected which is an abrupt change or step occurring in level between lines in a frame due to a flash of light, because of a difference in exposure time between each line of a video signal output for each frame from pixels included in the image sensor, a video signal of a previous frame output from the image sensor earlier than a frame containing the detected flash band.

According to the first and second aspects of the present technology, a flash band occurring in the case of shutter operation can be removed.

Note that the present technology is not necessarily limited to the above advantages. Any of advantages described in the present disclosure may be achieved.

BRIEF DESCRIPTION OF THE DRAWINGS

FIG. 13 is a diagram showing a specific example use of adaptive flash band correction.

DETAILED DESCRIPTION OF THE EMBODIMENT(S)

Figure 1:
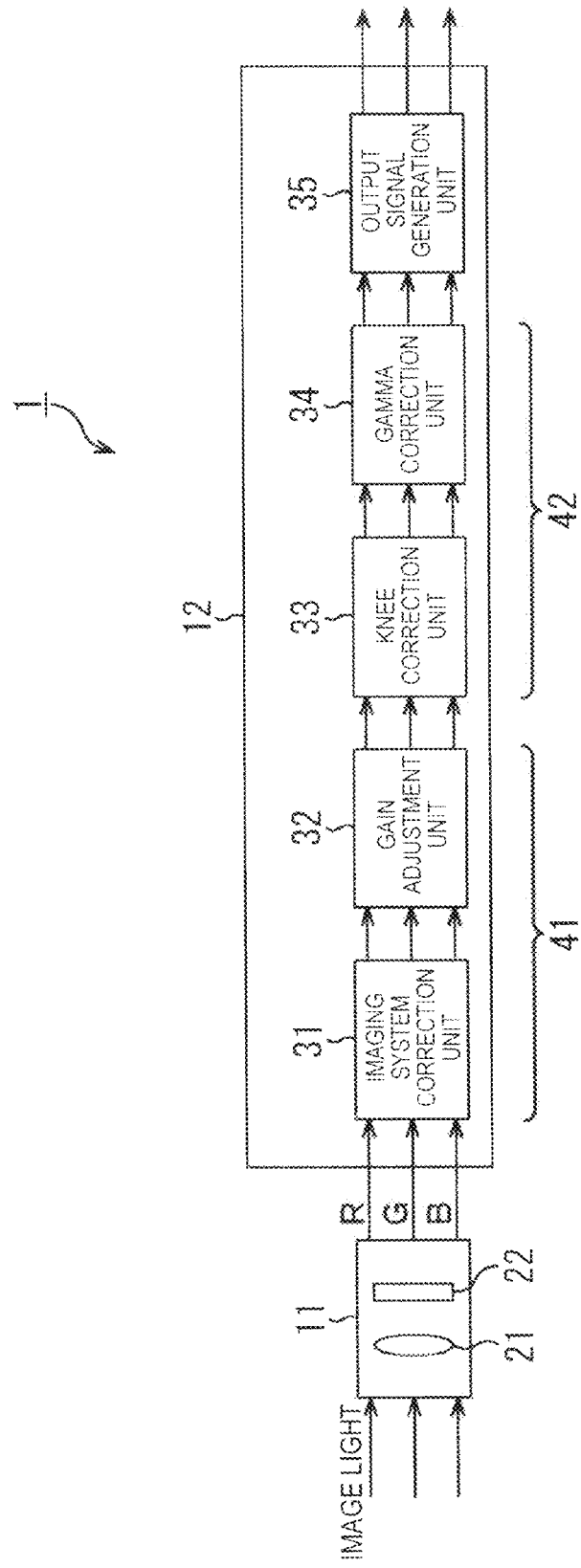
FIG. 1 is a block diagram showing a configuration of one embodiment of an imaging device to which the present technology is applied.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that the description will be given in the following order: 1. System Configuration; 2. Normal Flash Band Correction Process; 3. Flash Band Correction Process During Shutter Operation; 4. Advanced Flash Band Detection Process; and 5. Adaptive Flash Band Correction Process.

<1. System Configuration>

(Configuration of Imaging Device)

FIG. 1 is a block diagram showing a configuration of one embodiment of an imaging device to which the present technology is applied.

As shown in FIG. 1, the imaging device 1 includes an imaging unit 11 which includes a lens system 21, a rolling shutter image sensor 22, etc., to output video signals of the three primary colors R, G, and B, and a video signal processing circuit 12 which performs a predetermined video signal process on the video signals output from the imaging unit 11.

In the imaging unit 11, the image sensor 22 may be a complementary metal oxide semiconductor (CMOS) image sensor. The image sensor 22 is exposed to image light of a subject brought through the lens system 21 on a pixel-by-pixel basis, and outputs a video signal on a line-by-line basis. The imaging unit 11 also includes an analog/digital (A/D) conversion unit (not shown) to convert a video signal output from the image sensor 22, which is an analog signal, into an digital signal to generate a quantized video signal.

The video signal processing circuit 12 includes an imaging system correction unit 31, a gain adjustment unit 32, a knee correction unit 33, a gamma correction unit 34, and an output signal generation unit 35.

The imaging system correction unit 31 corrects a defect in a video signal supplied from the imaging unit 11, and supplies the defect-corrected video signal to the gain adjustment unit 32. The gain adjustment unit 32 adjusts the gain, etc., of the defect-corrected video signal supplied from the imaging system correction unit 31, and supplies the gain (etc.)-adjusted video signal to the knee correction unit 33.

Here, a combination of the imaging system correction unit 31 and the gain adjustment unit 32 is used as a linear correction unit 41 which performs linear correction on a video signal. Specifically, the imaging system correction unit 31 and the gain adjustment unit 32 perform the linear process on video signals of the three primary colors R, G, and B output from the imaging unit 11, and thereafter, supply the resultant signals to the knee correction unit 33.

The knee correction unit 33 performs level adjustment on the gain (etc.)—adjusted video signal supplied from the gain adjustment unit 32 so that the resultant video signal is compliant with a predetermined signal standard, and supplies the level-adjusted video signal to the gamma correction unit 34. The gamma correction unit 34 performs gamma correction on the level-adjusted video signal supplied from the knee correction unit 33 so that the level-adjusted video signal is suited to the monitor's gamma, and supplies the gamma-corrected video signal to the output signal generation unit 35.

Here, a combination of the knee correction unit 33 and the gamma correction unit 34 is used as a nonlinear correction unit 42 which performs nonlinear correction on a video signal. Specifically, the knee correction unit 33 and the gamma correction unit 34 perform the nonlinear process on the video signal on which the linear correction unit 41 has performed the linear process, and thereafter, supplies the resultant video signal to the output signal generation unit 35.

The output signal generation unit 35 converts the gamma-corrected video signal supplied from the gamma correction unit 34 into a final output format, and supplies the resultant video signal in the final output format to a downstream monitor (not shown), etc.

Figure 2:
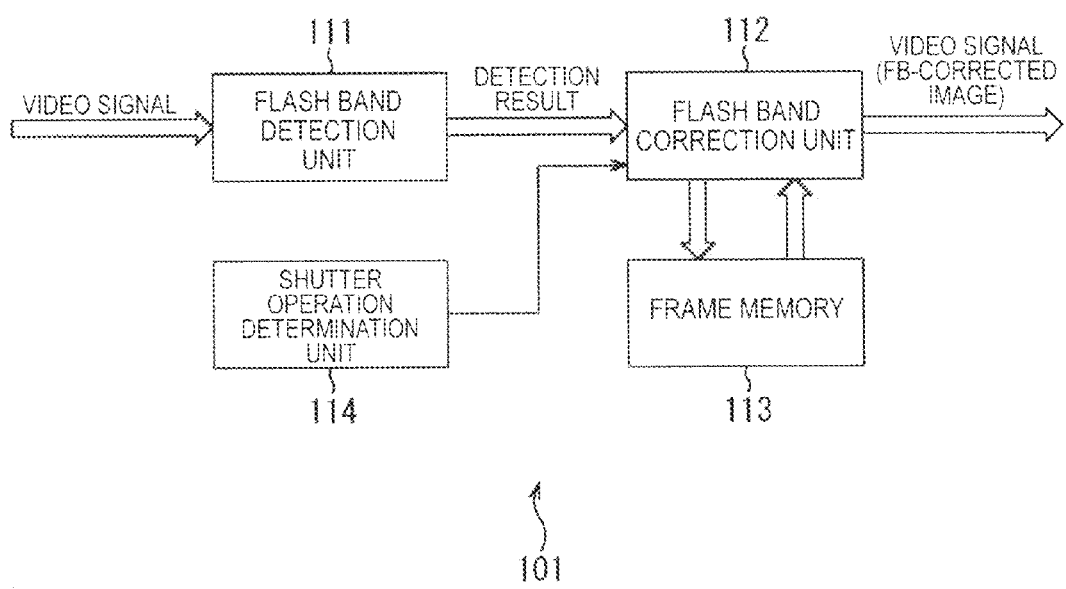
FIG. 2 is a block diagram showing a configuration of one embodiment of an image correction device to which the present technology is applied.

In the imaging device 1 thus configured, the exposure time varies from line to line of a video signal of each frame which is output at a predetermined frame rate by the rolling shutter the image sensor 22, and therefore, a flash band may occur, which is an abrupt change or step in luminance level between lines in a frame due to a flash of light. Therefore, the imaging system correction unit 31 includes an image correction device which corrects a flash band if the flash band has been detected. FIG. 2 shows such an image correction device.

(Configuration of Image Correction Device)

FIG. 2 is a block diagram showing a configuration of one embodiment of an image correction device to which the present technology is applied.

The image correction device 101 of FIG. 2 corrects a flash band if the flash band has been detected in a video signal output from the imaging unit 11. As shown in FIG. 2, the image correction device 101 includes a flash band detection unit 111, a flash band correction unit 112, a frame memory 113, and a shutter operation determination unit 114.

The flash band detection unit 111 performs a flash band detection process based on a video signal output from the imaging unit 11, and supplies the result of the detection to the flash band correction unit 112.

For example, in the flash band detection process, the level of each pixel is compared between successive frames, i.e., the current frame (input image) and the previous frame (previous image) to obtain the result of the comparison. Based on the result of the comparison, horizontal lines having a large change amount are found, and a line is detected which is located at a boundary between successive horizontal lines having a large change amount and successive horizontal lines having a small change amount, whereby the occurrence of a flash band is detected. In this case, a high luminance object which is wider than it is high is detected as a flash band. Note that a frame which is currently output by the imaging unit 11 refers to a current frame (hereinafter also referred to as "input image"), and a frame which is output earlier in time than a current frame is referred to as previous frame (hereinafter also referred to as "previous image").

As the detection result, for example, an FB start determination value which determines the start of a flash band or an FB end determination value which determines the end of a flash band, or the presence or absence of a flash band in a frame, etc., may be obtained.

Note that the FB start determination value is represented by "0" or "1." When it is "0," the FB start determination value indicates that a flash band has not started. When it is "1," the FB start determination value indicates that a flash band has started. The FB end determination value is represented by "0" or "1." When it is "0," the FB end determination value indicates that a flash band has not ended. When it is "1," the FB end determination value indicates that a flash band has ended.

The flash band correction unit 112 performs a flash band correction process based on the detection result supplied from the flash band detection unit 111, and outputs the resultant video signal (FB-corrected image). The frame memory 113 temporarily holds a video signal (frame) output from the imaging unit 11 under the control of the flash band correction unit 112.

In the flash band correction process, a flash band is corrected based on the result of determination by the shutter operation determination unit 114 of whether or not shutter operation has been performed in the imaging unit 11. For example, in the flash band correction process in the case without shutter operation (hereinafter also referred to as "normal flash band correction process"), a flash band is corrected by outputting an addition frame (full-frame flash image) which is obtained by adding the previous frame (previous image) and the current frame (input image) during a period of time from when the FB start determination value is detected until the FB end determination value is detected.

Also, for example, in the flash band correction process in the case of shutter operation, when a flash band has been detected within one frame, the flash band is corrected by stopping updating the frame memory 113, and outputting the previous frame (previous image) held in the frame memory 113.

(Flow of Flash Band Process)

Next, a flash band process performed by the image correction device 101 of FIG. 2 will be described with reference to a flowchart of FIG. 3. Note that the flash band process is repeatedly performed at predetermined timings.

In step S1, the shutter operation determination unit 114 determines whether or not shutter operation has been performed in the imaging unit 11 of the imaging device 1. If, in step S1, the shutter operation determination unit 114 determines that shutter operation has not been performed, i.e., the case without shutter operation, control proceeds to step S2.

In step S2, the flash band detection unit 111 performs the flash band detection process, and supplies the result of the detection to the flash band correction unit 112.

In step S3, the flash band correction unit 112 performs the normal flash band correction process based on the detection result from the flash band detection unit 111.

In the normal flash band correction process, a flash band is corrected by outputting an addition frame (full-frame flash image) which is obtained by adding the previous frame (previous image) and the current frame (input image) during a period of time from when a flash band is detected, i.e., the FB start determination value is detected until the FB end determination value is detected. Note that the normal flash band correction process will be described in detail below with reference to FIGS. 4 and 5.

On the other hand, if, in step S1, the shutter operation determination unit 114 determines that shutter operation has been performed, control proceeds to step S4. In step S4, the flash band detection unit 111 performs the flash band detection process, and supplies the result of the detection to the flash band correction unit 112.

In step S5, the flash band correction unit 112 performs the flash band correction process in the case of shutter operation based on the detection result from the flash band detection unit 111.

In the flash band correction process in the case of shutter operation, if a flash band has been detected in one frame, the updating of the frame memory 113 is stopped, and the previous frame (previous image) held in the frame memory 113 is output, whereby the flash band is corrected. Note that the flash band correction process in the case of shutter operation will be described in detail below with reference to FIGS. 6 to 8.

If the processes of steps S3 and S5 end, the flash band process ends,

In the foregoing, the flash band process has been described. In the flash band process, in the case without shutter operation, a flash band typically extends across two frames, and a flash band can be corrected using the two frames. In the case of shutter operation, an entire flash band is included in one frame, the flash band cannot be corrected in a manner similar to that which is performed in the case without shutter operation. Therefore, the flash band correction depends on whether or not shutter operation has been performed.

<2. Normal Flash Band Correction Process>

(Flow of Normal Flash Band Correction Process)

Next, the normal flash band correction process corresponding to the process of step S3 of FIG. 3, which is performed by the flash band correction unit 112, will be described in detail with reference to a flowchart of FIG. 4.

In step S101, the flash band correction unit 112 obtains the flash band detection result from the flash hand detection unit 111. In step S102, based on the flash band detection result, the flash band correction unit 112 determines whether or not the FB start determination value has been detected in the previous image (previous frame).

If, in step S102, it is determined that the FB start determination value has not been detected in the previous image, control proceeds to step S103. In step S103, based on the flash band detection result, the flash band correction unit 112 determines whether or not the FE end determination with respect to the previous image 1 V before is performed. In other words, in this determination process, it is determined whether or not the input current frame is the second input frame after the end of the flash band.

If, in step S103, it is determined that FB end determination with respect to the previous image 1 V before is not performed, the input current frame is not the second input frame after the end of the flash band, and therefore, control proceeds to step S104. In step S104, the flash band correction unit 112 outputs the previous frame held in the frame memory 113. In step S105, the flash band correction unit 112 updates the frame memory 113.

If, in step S103, it is determined that the FE end determination with respect to the previous image 1 V before is performed, the input current frame is the second input frame after the end of the flash band, and therefore, control proceeds to step S106. In step S106, the flash band correction unit 112 outputs an addition frame (addition image) which is obtained by calculating the arithmetic mean of the previous frame (previous image) and the current frame (input image). In step S107, the flash band correction unit 112 updates the frame memory 113.

On the other hand, if, in step S102, it is determined that the FB start determination value has been detected in the previous image, control proceeds to step S108. In step S108, based on the flash band detection result, the flash band correction unit 112 determines whether or not the FB end determination value is present in the previous image.

If, in step S108, it is determined that the FB end determination value is not present in the previous image, control proceeds to step S109. In step S109, the flash band correction unit 112 outputs an addition frame (full-frame flash image) which is obtained by adding the previous frame (previous image) and the current frame (input image) together. For example, the full-frame flash image is generated by calculating the arithmetic mean of two images in which a flash band occurs. In step S110, the flash band correction unit 112 updates the frame memory 113.

If, in step S108, it is determined that the FB end determination value is present, control proceeds to step S111. In step S111, the flash band correction unit 112 outputs the input current frame. In step S112, the flash band correction unit 112 updates the frame memory 113.

Figure 3:
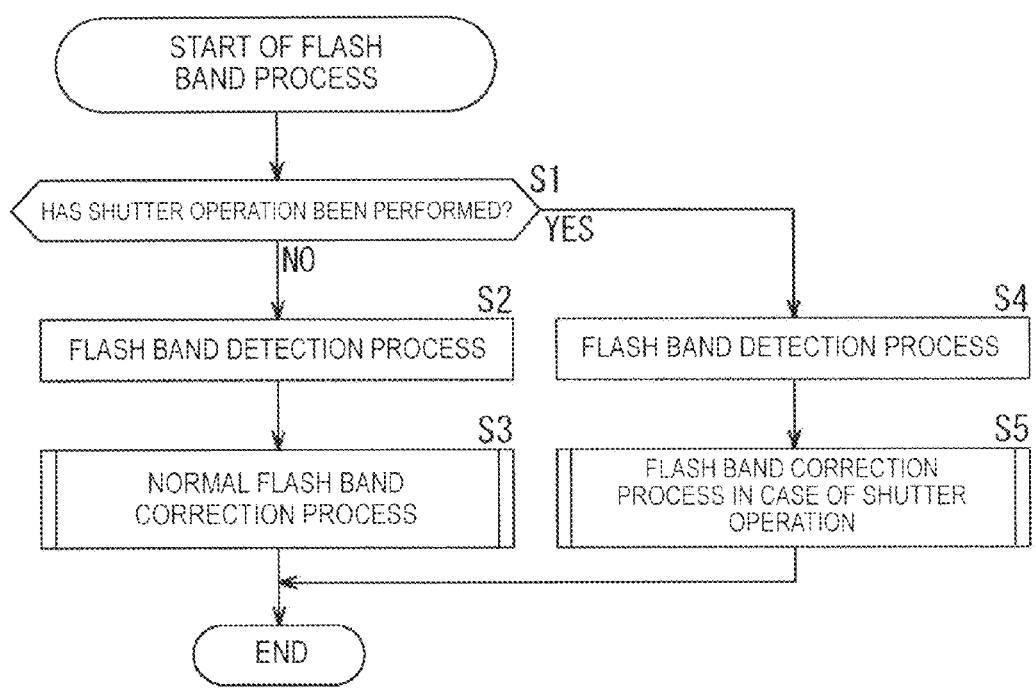
FIG. 3 is a flowchart for describing a flash band process.
Figure 4:
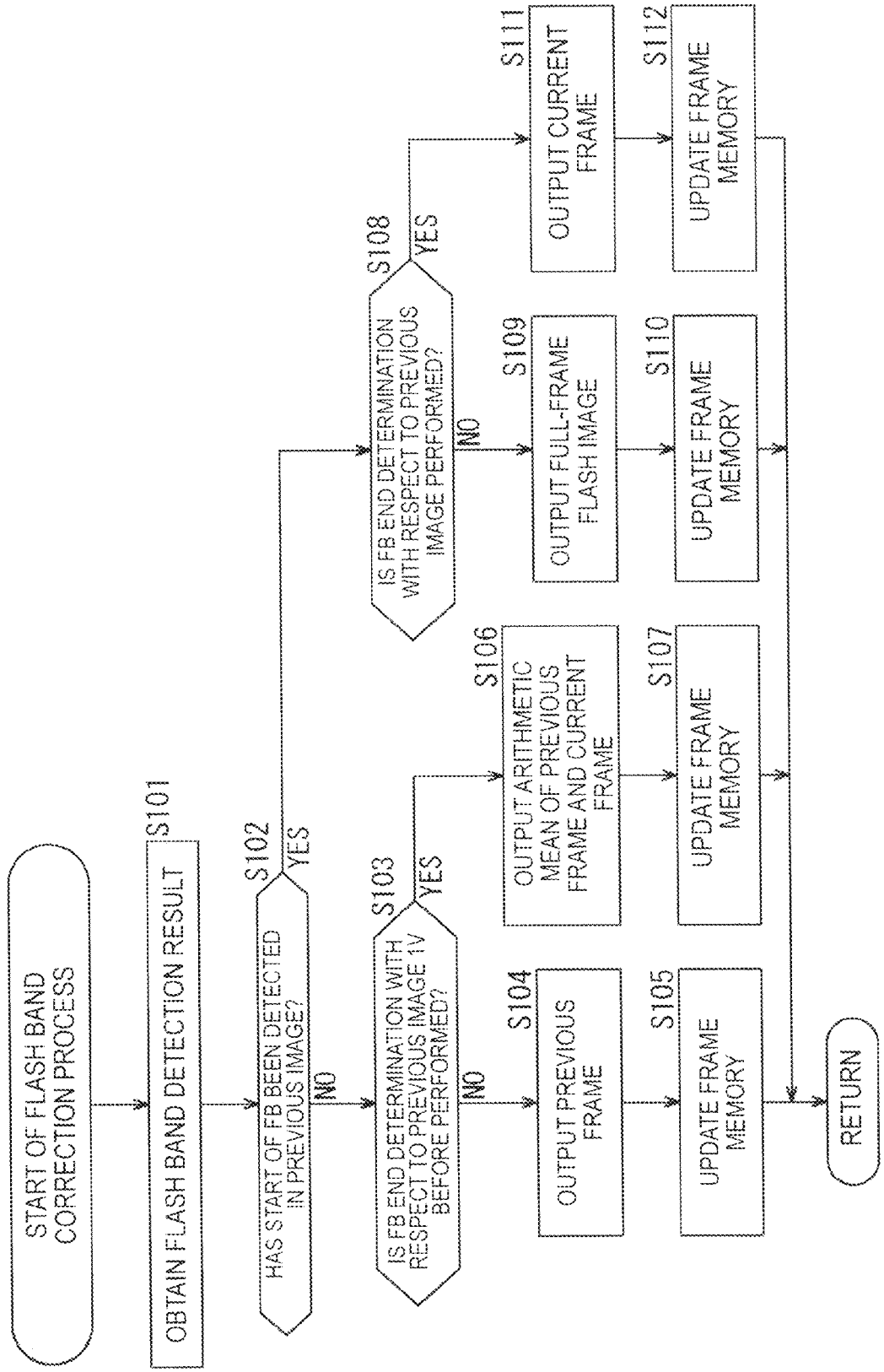
FIG. 4 is a flowchart for describing a normal flash band correction process in detail.

If any of the processes of steps S105, S107, S110, and S112 ends, control returns to step S3 of FIG. 3, and step S3 and the following steps are performed.

In the foregoing, the normal flash band correction process has been described. In the normal flash band correction, if a flash band has been detected, i.e., during an FB period of time from when the FB start determination value is detected in the previous image until the FB end determination value is detected, an addition frame (full-frame flash image) obtained by adding the previous frame and the current frame together is output (S109), and thereafter, when the FB end determination value is detected, the current frame is output directly without being processed by any correction technique (S111).

Also, if a flash band has not been detected, then when the FB end determination with respect to the previous image 1 V before is performed, an addition frame obtained by calculating the arithmetic mean of the previous frame and the current frame is output (S106), and therefore, the same image is not successively output, so that a smooth moving image is obtained. Note that if a flash band has not been detected, the previous frame (a frame for which FB detection has been performed) is output directly without being processed by any correction technique, and the frame memory 113 is updated with the current frame, and is ready for the next flash band correction (S104, S105).

(Schematic Diagram of Normal Flash Band Correction)

Figure 5:
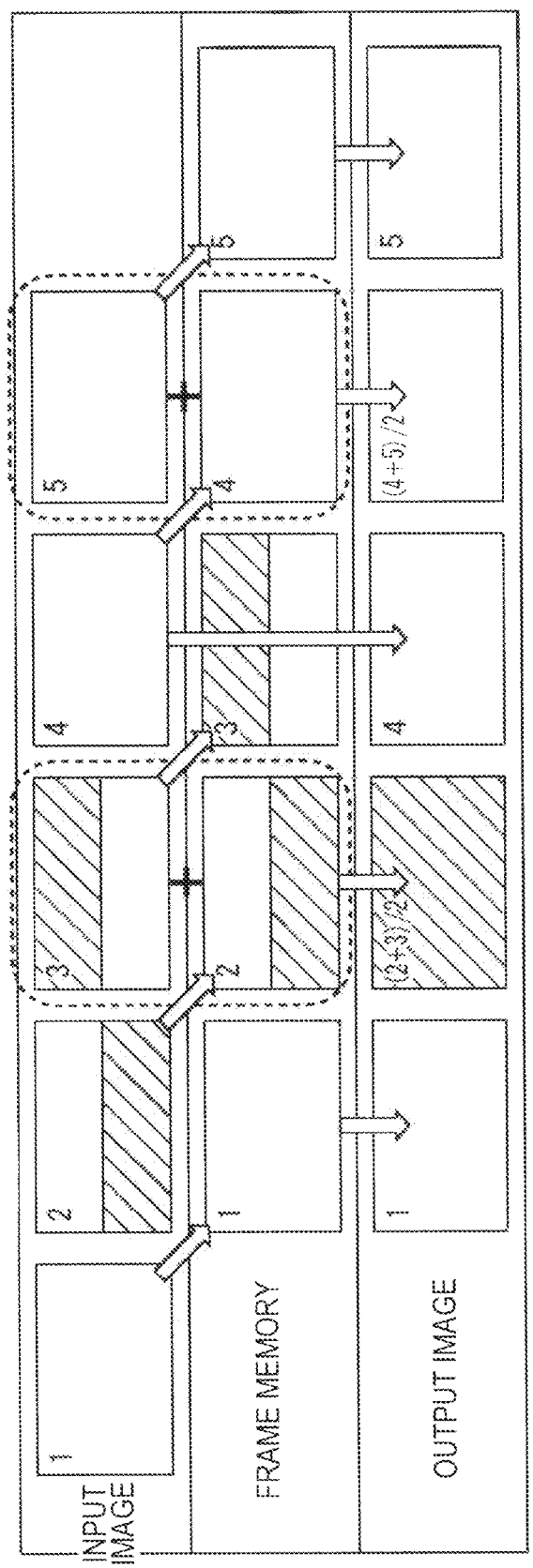
FIG. 5 is a diagram schematically showing normal flash band correction.

FIG. 5 is a diagram schematically showing normal flash band correction.

In FIG. 5, a video signal (input image) which is input to the flash band correction unit 112, a video signal (delayed image) which is temporarily held in the frame memory 113, and a video signal (output image) which is output from the flash band correction unit 112, are arranged in temporal order from left to right in FIG. 5. Also, in FIG. 5, rectangular patterns arranged in temporal order each represent a frame of video signal. The frames are given numbers at the upper left corner in order in which the frames are input. A hatched region in a frame represents a region in which a flash band occurs.

As shown in FIG. 5, if, in the case without shutter operation, a flash band has been detected in the lower half region of the frame 2 input following the frame 1, the previous frame 1 held in the frame memory 113 is output. The contents of the frame memory 113 are updated with the contents of the current frame 2.

In the case without shutter operation, a flash band typically extends across two frames. Therefore, in this example, a flash band is detected in the upper half region of the frame 3 in addition to the lower half region of the frame 2. In this case, because it is during an FB period of time from when the FB start determination value is detected until the FB end determination value is detected, a full-frame flash image is output which is an addition frame ((2+3)/2) obtained by adding the previous frame 2 and the current frame 3 together. The contents of the frame memory 113 are updated with the contents of the current frame 3.

Next, the frame 4 is input. Because the FB end determination value has been detected, the current frame 4 is output directly without being processed by any correction technique. The contents of the frame memory 113 are updated with the contents of the current frame 4.

Next, the frame 5 is input. Because a flash band has not been detected and the FB end determination performed 1 V before is performed, an addition frame ((4+5)/2) obtained by calculating the arithmetic mean of the previous frame 4 and the current frame 5 is output. As a result, the same image is not successively output, so that a smooth moving image is obtained. The contents of the frame memory 113 are updated with the contents of the current frame 5.

Thereafter, if a flash band has not been detected, the previous frame (e.g., the frames 5, 6, 7, . . . ) are output directly without being processed by any correction technique, and the frame memory 113 is updated with the current frame (e.g., the frames 6, 7, 8, . . . ), and is ready for the next flash band correction.

Thus, in the case without shutter operation, a flash band typically extends across two frames, and therefore, a full-frame flash image obtained by adding these frames (the previous image and the input image) together is generated and output, whereby a flash band is corrected.

<3. Flash Band Correction Process in Case of Shutter Operation>

Figure 6:
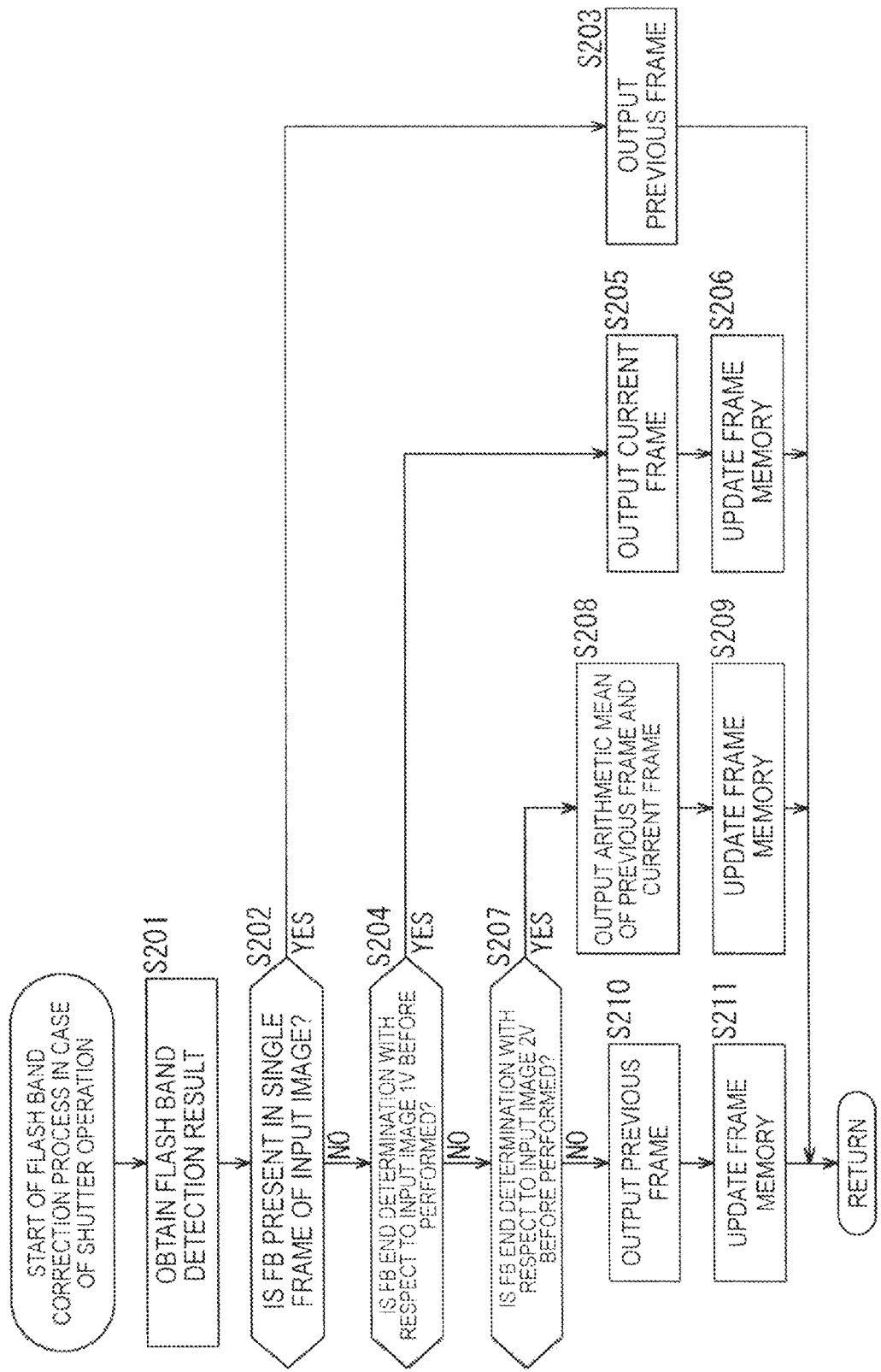
FIG. 6 is a flowchart for describing flash band correction process in the case of shutter operation in detail.

(Flow of Flash Band Correction Process in Case of Shutter Operation) Next, the flash band correction process in the case of shutter operation corresponding to the process of step S5 of FIG. 3, which is performed by the flash band correction unit 112, will be described in detail with reference to a flowchart of FIG. 6.

In step S201, the flash band correction unit 112 obtains the flash band detection result from the flash band detection unit 111. In step S202, based on the flash band detection result, the flash band correction unit 112 determines whether or not a flash band is present in a single frame of an input image.

If, in step S202, it is determined that a flash band is present in a single frame of an input image, control proceeds to step S203. In step S203, the flash band correction unit 112 outputs the previous frame held in the frame memory 113. Note that if a flash band has been detected in a single frame of an input image, the previous frame (previous image) temporarily held in the frame memory 113 is output, and the updating of the frame memory 113 is stopped so that the contents of the frame memory 113 are not updated with the current frame (input image).

On the other hand, if, in step S202, it is determined that a flash band is not present in a single frame of an input image, control proceeds to step S204. In step S204, based on the flash band detection result, the flash band correction unit 112 determines whether or not the FB end determination with respect to the input image 1 V before is performed. In other words, in this determination process, it is determined whether or not the input current frame is the first input frame after the end of the flash band.

If, in step S204, it is determined that the FB end determination with respect to the input image 1 V before is performed, the input current frame is the first frame after the end of the flash band, and therefore, control proceeds to step S205. In step S205, the flash band correction unit 112 outputs the input current frame. In step S206, the flash band correction unit 112 updates the frame memory 113.

If in step S204, it is determined that the FB end determination with respect to the input image 1 V before is not performed, control proceeds to step S207. In step S207, based on the flash band detection result, the flash band correction unit 112 determines whether or not the FB end determination with respect to the input image 2 V before is performed. In other words, in this determination process, it is determined whether or not the input current frame is the second input frame after the end of the flash band.

If, in step S207, it is determined that the FB end determination with respect to the input image 2 V before is performed, the input current frame is the second frame after the end of the flash band, and therefore, control proceeds to step S208. In step S208, the flash band correction unit 112 outputs an addition frame (addition image) obtained by calculating the arithmetic mean of the previous frame (previous image) and the current frame (input image). In step S209, the flash band correction unit 112 updates the frame memory 113.

If, in step S207, it is determined that the FB end determination with respect to the input image 2 V before is not performed, control proceeds to step S210. In step S210, the flash band correction unit 112 outputs the previous frame held in the frame memory 113. In step S211, the flash band correction unit 112 updates the frame memory 113.

If any of the processes of steps S203, S206, S209, and S211 ends, control returns to step S5 of FIG. 3, and step S5 and the following steps are performed.

In the foregoing, the flash band correction in the case of shutter operation has been described. In the flash band correction process in the case of shutter operation, if a flash band has been detected in a single frame of an input image, the previous frame in the frame memory 113 is output, and the updating of the frame memory 113 is stopped (S203). Thereafter, if a flash band has not been detected in one frame of an input image, then when the FB end determination with respect to the input image 1 V before is performed, the current frame is output (S205), and when the FB end determination with respect to the input image 2 V before is performed, an addition frame obtained by calculating the arithmetic mean of the previous frame and the current frame is output (S208).

(Schematic Diagram of Correction of Flash Band in Single Frame in the Case of Shutter Operation)

Figure 7:
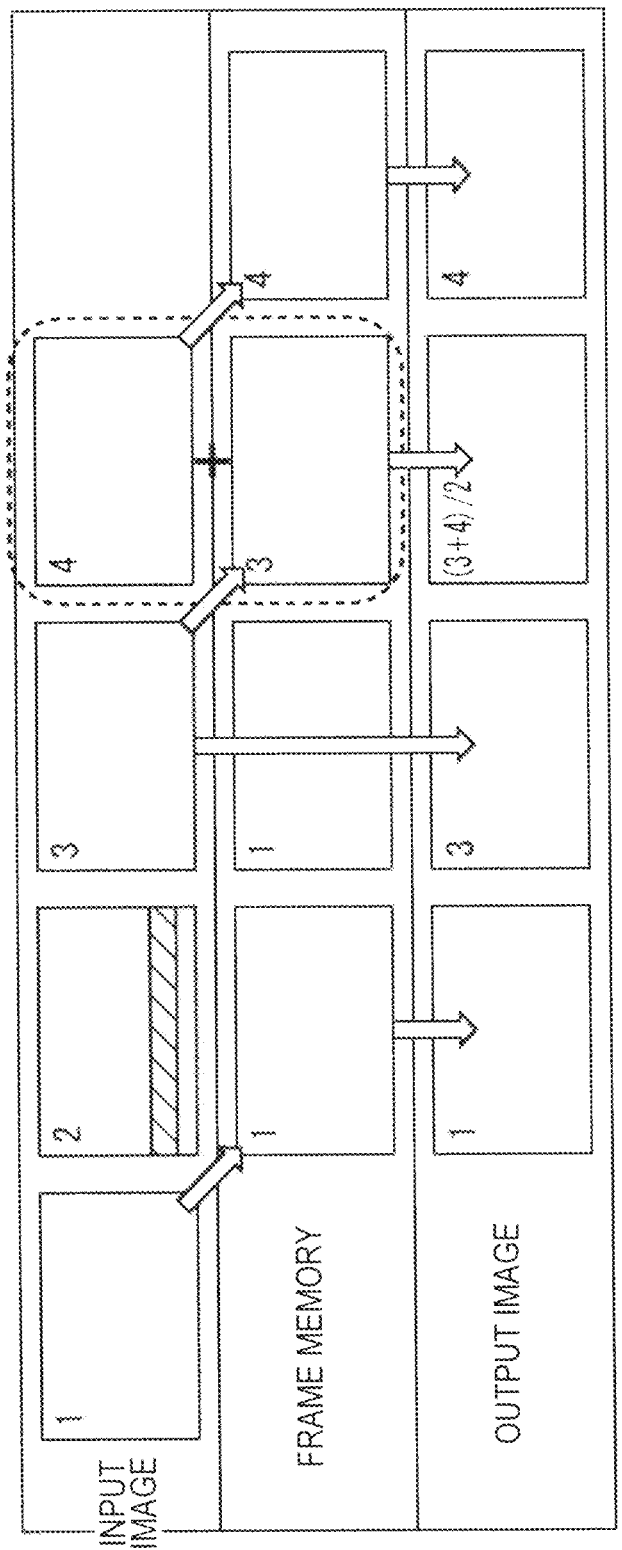
FIG. 7 is a diagram schematically showing correction of a flash band in a single frame in the case of shutter operation.

FIG. 7 is a diagram schematically showing correction of a flash band in a single frame in the case of shutter operation. Note that FIG. 7 shows an example in which a single flash band (a hatched region in a frame) occurs only in the frame 2 of the rectangular frames (input images) arranged in temporal order.

As shown in FIG. 7, when a flash band has been detected in the frame 2 input following the frame 1 in the case of shutter operation, the previous frame 1 held in the frame memory 113 is output. In this case, the contents of the frame memory 113 are not updated with the current frame 2, and the frame memory 113 continues to hold the previous frame 1. In other words, the updating of the frame memory 113 is stopped.

Next, the frame 3 is input, which is the first frame after the end of the flash band, and a flash band has not been detected in the frame 3 and the FB end determination performed 1 V before is performed. Therefore, the current frame 3 is output instead of the previous frame 1 held in the frame memory 113. The contents of the frame memory 113 are updated with the contents of the current frame 3. In other words, the updating of the frame memory 113 is resumed.

Next, the frame 4 is input, which is the second frame after the end of the flash band, and a flash band has not been detected in the frame 4 and the FB end determination performed 1 V before is performed. Therefore, an addition frame ((3+4)/2) obtained by calculating the arithmetic mean of the previous frame 3 and the current frame 4 is output. As a result, the successive output of the same frame can be prevented, whereby smooth video can be displayed. The contents of the frame memory 113 are updated with the contents of the current frame 4.

Thus, in the case of shutter operation, when a flash band occurs in a single frame, i.e., there are not successive frames in which a flash band is detected, the current frame is not input to the frame memory 113, i.e., an image delayed by one frame which is held in the frame memory 113 is not updated. As a result, the previous frame (previous image) before a flash band is detected is output. Therefore, even if a flash band occurs in a single frame in the case of shutter operation, the flash band can be removed.

In the flash band correction in a single frame, the frame memory 113 invariably holds only one frame. Therefore, the frame memory 113 may have a capacity for only one frame. In other words, the flash band correction in a single frame can be performed using a frame memory having a capacity for only one frame. Note that if the capacity of the frame memory 113 is increased, a previous frame (FB-corrected image) from which a flash band has been removed can be generated. However, in this case, a delay occurs in a video, or large hardware resources are required, and therefore, it may not be appropriate to use such a configuration.

(Schematic Diagram of Correction of Flash Band in Each of Successive Frames in the Case of Shutter Operation)

Figure 8:
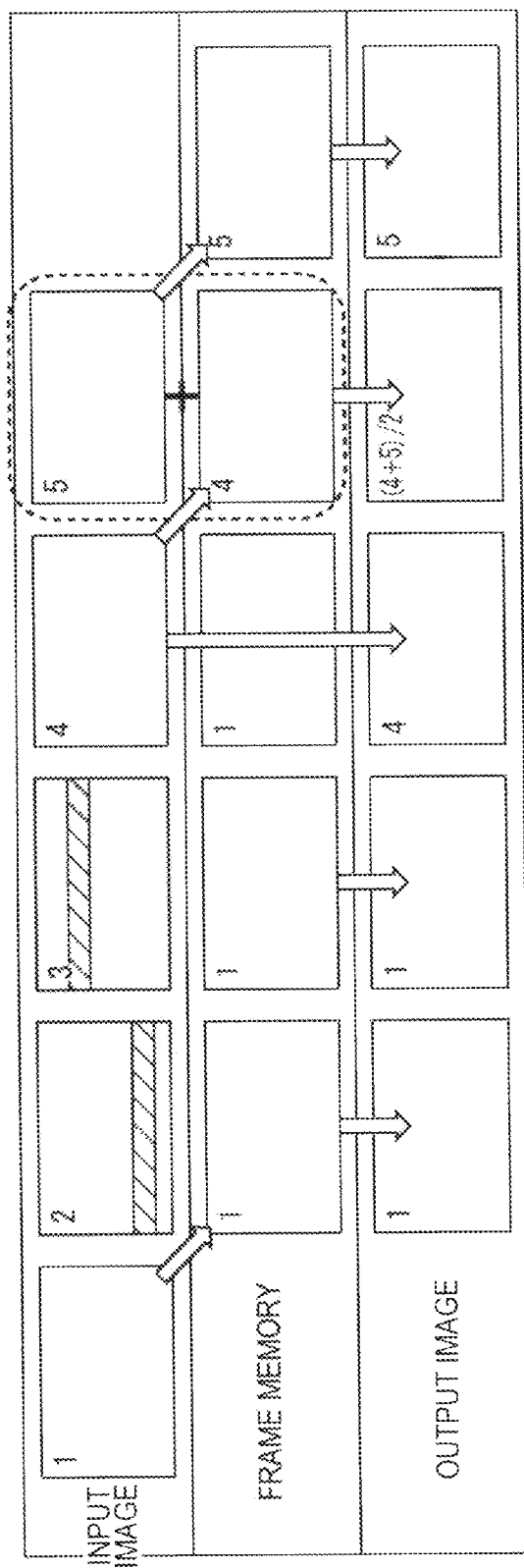
FIG. 8 is a diagram schematically showing correction of a flash band in each of successive frames in the case of shutter operation.

FIG. 8 is a diagram schematically showing correction of a flash band in each of successive frames in the case of shutter operation. Note that, in FIG. 8, of rectangular frames (input images) arranged in temporal order, a flash band (a hatched region in a frame) occurs in each of the successive frames 2 and 3.

As shown in FIG. 8, when a flash band has been detected in the frame 2 input following the fame 1 in the case of shutter operation, the previous frame 1 held in the frame memory 113 is output. In this case, the contents of the frame memory 113 are not updated with the current frame 2, and the frame memory 113 continues to hold the previous frame 1. In other words, the updating of the frame memory 113 is stopped.

Next, the frame 3 is input. When a flash band has also been detected in the frame 3 following the frame 2, the previous frame 1 held in the frame memory 113 is output. In this case, the contents of the frame memory 113 are not updated with the current frame 3, and the frame memory 113 continues to hold the previous frame 1.

Next, the frame 4, which is the first frame after the end of the flash band, is input. Because a flash band has not been detected in the frame 4 and the FB end determination performed 1 V before is not performed, the current frame 4 is output instead of the previous frame 1 held in the frame memory 113. The contents of the frame memory 113 are updated with the contents of the current frame 4. In other words, the updating of the frame memory 113 is resumed.

Next, the frame 5, which is the second frame after the end of the flash band, is input. Because a flash band has not been detected in the frame 5 and the FB end determination performed 1 V before is performed, an addition frame ((4+5)/2) obtained by calculating the arithmetic mean of the previous frame 4 and the current frame 5 is output. As a result, the successive output of the same frame can be reduced or prevented, whereby a smooth video can be displayed. The contents of the frame memory 113 are updated with the contents of the current frame 5.

Thus, in the case of shutter operation, when there are successive frames in which a flash band is detected, i.e., a flash band occurs in each of successive frames, the current frame is not input to the frame memory 113, i.e., an image delayed by one frame which is held in the frame memory 113 is not updated. As a result, a previous frame (previous image) before a flash band is detected is output. Therefore, even if a flash band occurs in each of many successive frames in the case of shutter operation, the flash bands can be removed.

In the flash band correction in each of successive frames, only one frame is held in the frame memory 113 all the time as in the above flash band correction in a single frame, and therefore, the frame memory 113 may have a capacity for only one frame. In other words, a frame memory having a capacity for only one frame can be used to perform flash band correction in each of successive frames.

<4. Advanced Flash Band Detection Process>

Incidentally, in the normal flash band detection process, a high luminance object which is wider than it is high is detected as a flash band. However, in the normal flash band detection process, if only a subject is illuminated with a flash of light, the detection rate may decrease extremely due to the small proportion of the flash of light in the detection frame, so that the detection accuracy cannot be maintained in some cases.

Therefore, in order to address such a phenomenon, the subject face detection function, etc., which is possessed by the imaging device 1 is used to place a flash band detection frame (hereinafter referred to as "FB detection frame") at the position of a subject, and set the position and size of the FB detection frame to optimum values. As a result, the detection accuracy can be maintained even when only a subject is illuminated with a flash of light.

(Example Settings of FB Detection Frame)

Figure 9:
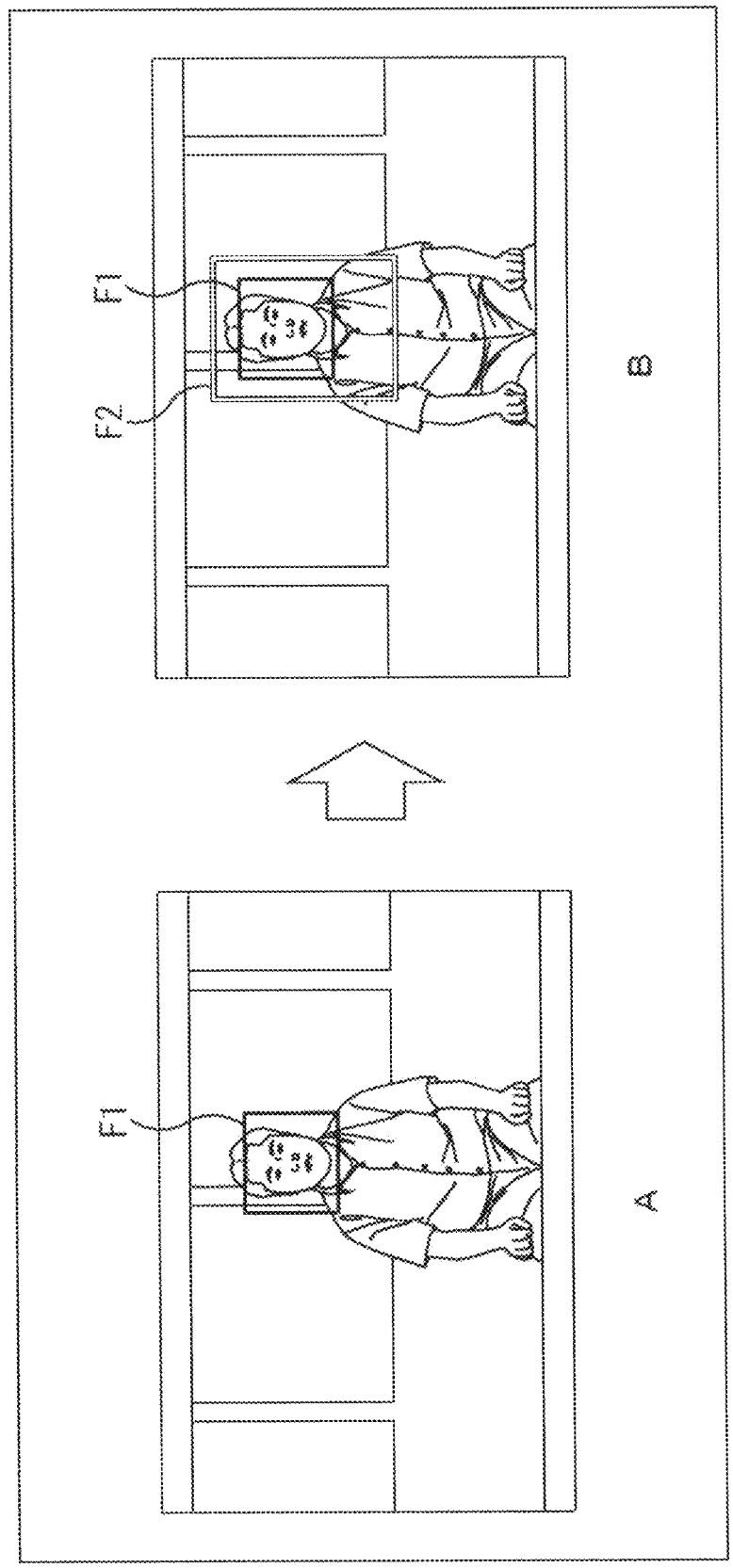
FIG. 9 is a diagram showing example setting of an FB detection frame for one subject.
Figure 10:
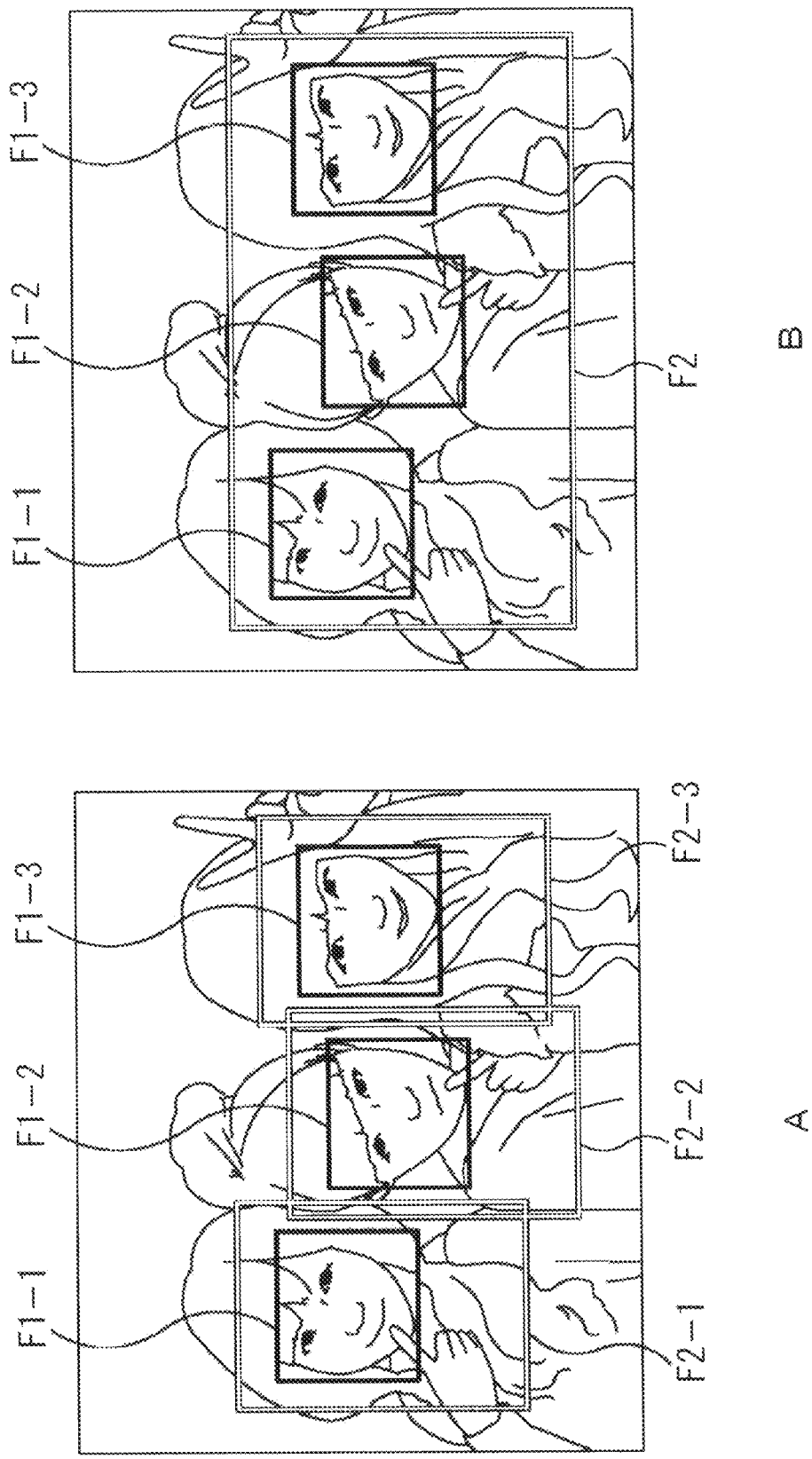
FIG. 10 is a diagram showing example setting of an FB detection frame(s) for a plurality of subjects.

FIGS. 9 and 10 show example settings of the FB detection frame.

In A of FIG. 9, a face detection frame F1 is set on the face of a human subject by the face detection function possessed by the imaging device 1. As shown in B of FIG. 9, an FB detection frame F2 is set using face detection information used in the face detection function. Thus, when the FB detection frame F2 is set, then even if, for example, a flash of light does not reach the background and only the subject is illuminated with the flash of light, the proportion of a flash of light in the FB detection frame F2 does not decrease, and therefore, the decrease in the flash band detection rate can be reduced.

Also, as shown in FIG. 10, even when there are a plurality of human subjects, an FB detection frame can be set. For example, in A of FIG. 10, for a plurality of human subjects for which face detection frames F1-1 to F1-3 are set respectively, FB detection frames F2-1 to F2-3 corresponding to the respective face detection information of the human subjects are set. Alternatively, for example, in B of FIG. 10, for a plurality of human subjects for which face detection frames F1-1 to F1-3 are set respectively, a single FB detection frame F2 corresponding to a position relationship of the human subjects is set.

Thus, the position and size of the FB detection frame F2 are set to optimum values, depending on the position, size, etc., of a subject. Therefore, even when only a subject is illuminated with a flash of light, the detection accuracy can be maintained. Also, when there are a plurality of human subjects, the FB detection frame F2 may be set at the position of each human subject, or a single optimum FB detection frame may be set based on a position relationship of the human subjects, or the like, based on a plurality of pieces of face detection information.

Although the FB detection frame F2 is set based on the subject detection information, the FB detection frame F2 may have any position and size if a flash band caused by a flash of light can be detected when only a subject is illuminated with the flash of light. Also, the position and size of the FB detection frame F2 may be dynamically changed based on the subject detection information, such as face detection information, etc. As a result, a flash band is detected in the FB detection frame F2 while the position and size of the FB detection frame F2 are dynamically changed based on face detection information, etc.

(Flow of Flash Band Detection Process Using FB Detection Frame)

Figure 11:
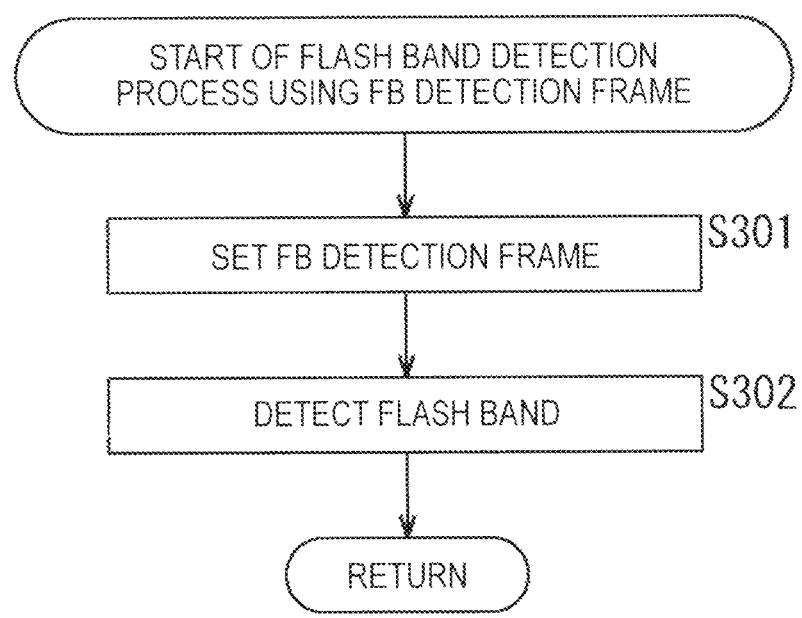
FIG. 11 is a flowchart for describing a flash band detection process using an FB detection frame.

Next, the flash band detection process using an FB detection frame, which is performed by the flash band detection unit 111, will be described with reference to a flowchart of FIG. 11. Note that the flash band detection process using an FB detection frame is performed instead of the flash band detection process of steps S2 and S4 of FIG. 3.

In step S301, the flash band detection unit 111 sets an FB detection frame based on face detection information, etc. Here, for example, the FB detection frame F2 is set as shown in FIGS. 9 and 10.

In step S302, the flash band detection unit 111 performs flash band detection in an FB detection frame which has been set by the process of step S301, based on a video signal output from the imaging unit 11, and supplies to the result of the detection to the flash band correction unit 112.

For example, in this flash band detection process, two FB detection frames are set, i.e., an FB detection frame based on face detection information and an FB detection frame for the entire screen (entire frame). If only a subject is illuminated with a flash of light, flash band detection is performed in the FB detection frame set based on face detection information. Otherwise, flash band detection is performed in the FB detection frame for the entire screen. Note that, here, for example, an FB detection frame having a predetermined area may be fixedly set at a center portion of the screen instead of the FB detection frame set based on face detection information.

If the process of step S302 ends, control returns to step S2 or S4 of FIG. 3, and step S2 or S4 and the following steps are performed.

In the foregoing, the flash band detection process using an FB detection frame has been described. In the flash band detection process using an FB detection frame, by setting an FB detection frame corresponding to a subject, even if only a subject is illuminated with a flash of light, the decrease in the flash band detection rate can be reduced, so that the detection accuracy can be maintained. As a result, even if only a subject is illuminated with a flash of light, the flash band detection rate can be improved. Therefore, more advanced flash band detection can be performed.

<5. Adaptive Flash Band Correction Process>

Incidentally, when the image correction device 101 performs the flash band process all the time, a video signal which has been processed by flash band correction is output as a live video, or is stored as stored data in a recording medium. Therefore, flash band correction cannot be subsequently performed using large-scale resources, such as a dedicated editing device, etc. Therefore, there has been a demand for a technique of allowing raw data before flash band correction (a video signal before correction) to remain unchanged, and subsequently performing flash band correction using large-scale resources.

Therefore, in order to meet such a demand, in the image correction device 101, when real-time flash band correction is highly demanded, i.e., for example, a video signal for a live video is output, a video signal which has been processed by flash band correction is output. On the other hand, when real-time flash band correction is not highly demanded, i.e., for example, data to be stored is output, a video signal which has not been processed by flash band correction is output. Thus, in the image correction device 101, it is adaptively determined whether or not flash band correction is to be performed, depending on the purpose of use of a video signal.

(Configuration of Image Correction Device)

Figure 12:
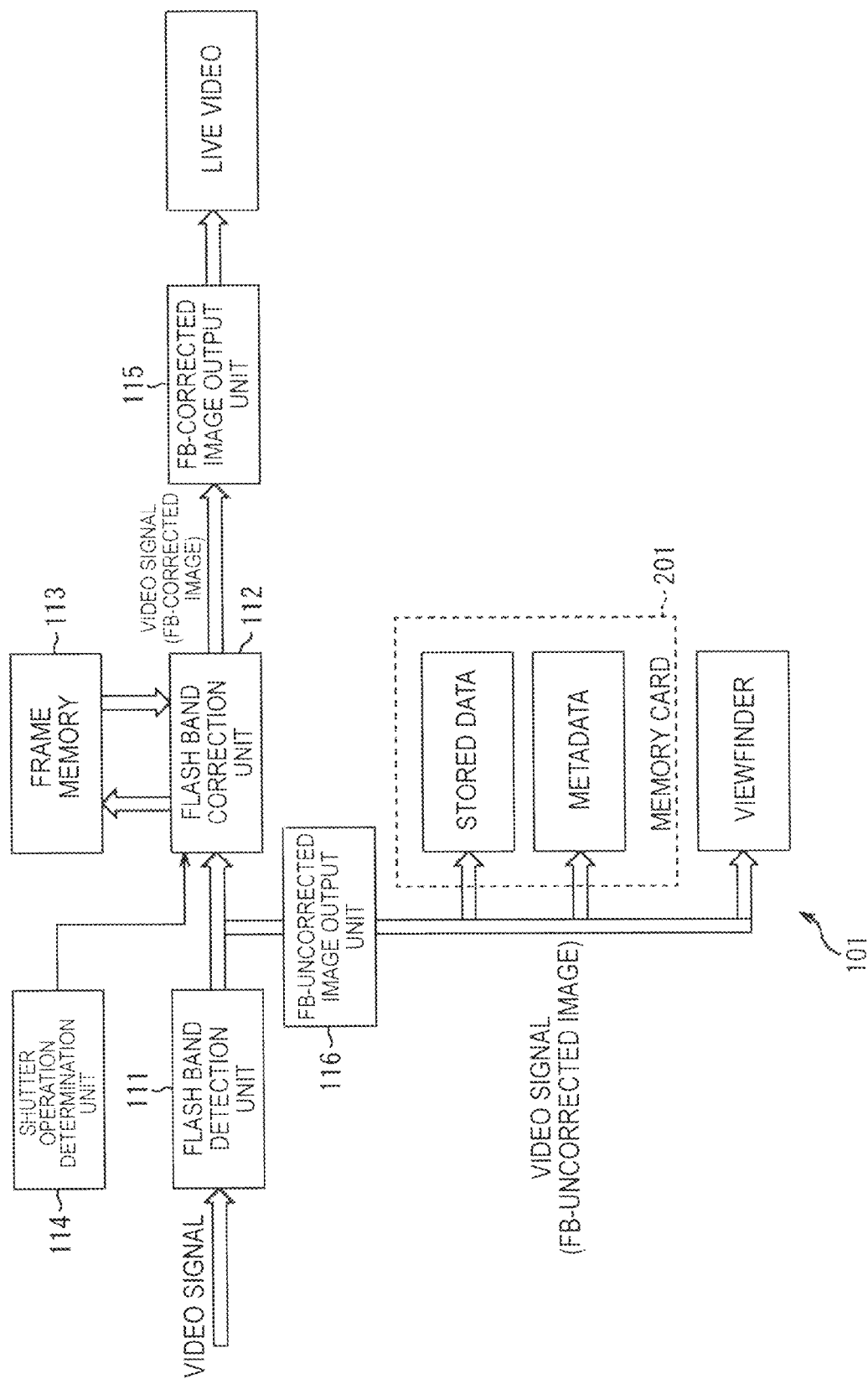
FIG. 12 is a block diagram showing an example configuration of an image correction device which performs adaptive flash band correction.

FIG. 12 is a block diagram showing an example configuration of an image correction device which performs adaptive flash band correction.

In the image correction device 101 of FIG. 12, when an input video signal is used for a live video, then if a flash band has been detected by the flash band detection unit 111, the flash band correction unit 112 performs flash band correction. A video signal (FB-corrected image) corrected by the flash band correction unit 112 is output as a live video by an FB-corrected image output unit 115.

Specifically, in this case, for example, the above flash band correction process described with reference to FIGS. 6 to 8, etc., is performed.

Also, in the image correction device 101 of FIG. 12, when an input video signal is used for stored data, the flash band correction unit 112 does not perform flash band correction, irrespective of whether the flash band detection unit 111 has detected a flash band. A video signal (FB-uncorrected image) output from the flash band detection unit 111 is recorded as stored data to a recording medium, such as a memory card 201, etc., by an FB-uncorrected image output unit 116. Note that the memory card 201 may store metadata which is to be used in a subsequent editing process, etc., together with the stored data, etc. The FB-uncorrected image may also be used as viewfinder data.

Although, in the image correction device 101 of FIG. 12, a video signal (FB-uncorrected image) used for stored data, etc., is supplied to the memory card 201 through the flash band detection unit 111, the video signal may be supplied to the memory card 201 directly without through the flash band detection unit 111.

(Specific Example Use)

FIG. 13 is a diagram showing a specific example use of the adaptive flash band correction.

As shown in FIG. 13, the imaging device 1 includes the image correction device 101 (FIG. 12). When the imaging device 1 outputs a live video, the imaging device 1 performs the flash band process (FIG. 3) on a captured video signal, and if a flash band has been detected, outputs the video signal (FB-corrected image) which has been processed by flash band correction. The video signal output as a live video from the imaging device 1 is sent by a transmitter 301 provided in a broadcast station, etc., and received by a receiver 302, such as a television set, etc. As a result, the receiver 302 displays the live video from the imaging device 1, and that video is an FB-corrected image which has been processed by flash band correction.

Also, as shown in FIG. 13, when the imaging device 1 outputs stored data, the imaging device 1 records a captured video signal (FB-uncorrected image) which has not been processed by flash band correction to the memory card 201 without performing the flash band process (FIG. 3) on the video signal. Thereafter, the memory card 201 is loaded into the editing device 303, which reads the video signal (FB-uncorrected image) which has not been processed by flash band correction from the memory card 201, and records the video signal to a built-in hard disk drive (HDD), etc. The editing device 303 has large-scale resources, such as a high-performance central processing unit (CPU), a large-capacity frame memory, etc., and can use the large-scale resources to perform flash band correction on the video signal (FB-uncorrected image) obtained from the memory card 201.

For example, when a flash band extending across three or more frames occurs, the editing device 303 can use the large-capacity frame memory to improve the accuracy of flash band correction. Also, for example, when a flash has been detected in the case of shutter operation, the editing device 303 can perform high-quality correction which cannot be achieved without large-scale resources, such as correction of the screen as if the entire screen were illuminated with a flash of light, etc. Moreover, a situation that an incomplete flash band correction leads to a decrease in the detection rate in a subsequent process can be reduced or prevented.

Although, as described above, metadata may be recorded together with stored data in the memory card 201, the metadata may contain detection information of a flash band detected by the flash band detection unit 111 of the image correction device 101. In this case, for example, the metadata may be compared with a video signal (FB-corrected image) which is distributed as a live video. If various items of metadata are used, the time it takes to perform an editing process may be reduced, for example.

In the foregoing description, a video signal (FB-uncorrected image) which has not been processed by flash band correction is sent from the imaging device 1 to the editing device 303 through a recording medium, such as the memory card 201, etc. Alternatively, if the imaging device 1 and the editing device 303 can be connected together through a network, such as the Internet, etc., that video signal may be sent through the network.

Note that the above series of processes can be executed by hardware, or can be executed by software. In the case where the series of processes is executed by software, a program configuring this software is installed in a computer included in dedicated hardware, or a general-purpose personal computer which can execute various functions when various programs are installed, etc., from a recording medium.

This recording medium may be configured not only as a removable medium, such as a magnetic disk, optical disk, magneto-optical disk, semiconductor memory, etc., that records a program and is distributed in order to provide the program to a user, separately from a computer, but also as a ROM, recording unit, etc., that records a program and is provided to a user while being previously incorporated in a computer.

A program for executing the above series of processes may be installed in a computer through a wired or wireless communication medium, such as a local area network, the Internet, digital satellite broadcasting, etc., optionally using an interface, such as a router, modem, etc.

Note that each step described in the above flowcharts may be executed by a single apparatus or by a plurality of apparatuses in a distributed manner. In the case where a plurality of processes are included in a single step, the plurality of processes included in the single step may be executed by a single apparatus or by a plurality of apparatuses in a distributed manner.

It should be understood by those skilled in the art that various modifications, combinations, sub-combinations and alterations may occur depending on design requirements and other factors insofar as they are within the scope of the appended claims or the equivalents thereof.

Additionally, the present technology may also be configured as below.

(1) An image correction device including:
a flash band detection unit configured to detect a flash band, the flash hand being a step occurred between levels for respective lines in a frame by a flash of light, the step being occurred by a difference in exposure time between the lines of a video signal output for each frame from pixels included in a rolling shutter image sensor;
a shutter operation determination unit configured to determine whether or not shutter operation has been performed in an imaging device including the image sensor; and
a flash band correction unit configured to, when the shutter operation determination unit determines that shutter operation has been performed and the flash band detection unit has detected the flash hand, output a video signal of a previous frame output from the image sensor earlier than a frame containing the detected flash band.

(2) The image correction device according to (1), wherein
the flash band correction unit outputs, in a first frame output immediately after an end of the flash band, a video signal contained in a frame output by the image sensor immediately after the end of the flash band, and outputs, in a second frame output following the first frame, a video signal output based on the video signal of the frame immediately after the end of the flash band and a video signal of a frame output by the image sensor following the frame immediately after the end of the flash band.

(3) The image correction device according to (1) or (2), wherein
when the shutter operation determination unit determines that shutter operation has not been performed and the flash hand detection unit has detected the flash band, the flash band correction unit outputs, in a first frame output immediately after the detection of the flash hand, a video signal of a previous frame output from the image sensor earlier than the frame containing the detected flash band, and outputs, in a second frame output following the first frame, a video signal calculated based on the video signal of the frame containing the detected flash band and a video signal of a frame output by the image sensor following the frame containing the detected flash band.

(4) The image correction device according to any one of (1) to (3), wherein
the flash band detection unit sets a plurality of frames for detecting the flash band.

(5) The image correction device according to any one of (1) to (3), wherein
the flash band detection unit dynamically changes a setting of a frame for detecting the flash band.
(6) The image correction device according to (5), wherein
the flash band detection unit changes the setting of the frame for detecting the flash band, based on detection information of a subject in the imaging device.
(7) The image correction device according to (6), wherein
the detection information of the subject is face detection information of the subject.
(8) The image correction device according to any one of (1) to (7), wherein
the flash band correction unit determines whether or not the flash band correction is to be performed, based on a purpose of use of the video signal.
(9) The image correction device according to any one of (1) to (8), further inluding:
a recording output unit configured to output a video signal which has not been corrected by the flash band correction unit to a recording medium.
(10) An image correction method including:
detecting a flash band, the flash band being a step occurred between levels for respective lines in a frame by a flash of light, the step being occurred by a difference in exposure time between the lines of a video signal output for each frame from pixels included in a rolling shutter image sensor;
determining whether or not shutter operation has been performed in an imaging device including the image sensor; and
outputting, when determining that shutter operation has been performed and the flash band has been detected, a video signal of a previous frame output from the image sensor earlier than a frame containing the detected flash band.
(11) An imaging device including:
an imaging unit including a rolling shutter image sensor; and
a video signal processing circuit including
a flash band detection unit configured to detect a flash band, the flash band being a step occurred between levels for respective lines in a frame by a flash of light, the step being occurred by a difference in exposure time between the lines of a video signal output for each frame from pixels included in the image sensor, and
a flash band correction unit configured to correct the flash band,
wherein, when the imaging unit has performed shutter operation and the flash band detection unit has detected the flash band, the flash band correction unit outputs a video signal of a previous frame output from the image sensor earlier than a frame containing the detected flash band.
(12) The imaging device according to (11), further including:
a first output unit configured to output a video signal corrected by the flash band correction unit; and
a second output unit configured to output a video signal which has not been corrected by the flash band correction unit.

What is claimed is:
1. An image correction device comprising:
circuitry configured to:
detect a flash band, the flash band being a step occurred between levels for respective lines in a frame by a flash of light, the step being occurred by a difference in exposure time between the lines of a video signal output for each frame from pixels included in a rolling shutter image sensor;
identify a frame including an end of the flash band; and
when the circuitry has detected the flash band in a current frame, output a video signal of a previous frame output from the rolling shutter image sensor earlier than the current frame containing the detected flash band, wherein
when the flash band is not detected in the current frame and the current frame is second in order immediately after the identified frame including the end of the flash band, the circuitry outputs a video signal that is an arithmetic mean of the previous frame and the current frame.
2. The image correction device according to claim 1, wherein
the circuitry outputs, in a first frame output immediately after the identified frame including the end of the flash band, a video signal contained in a frame output by the image sensor immediately after the identified frame including the end of the flash band.
3. The image correction device according to claim 1, wherein
the circuitry sets a plurality of frames for detecting the flash band.
4. The image correction device according to claim 1, wherein
the circuitry dynamically changes a setting of a frame for detecting the flash band.
5. The image correction device according to claim 4, wherein
the circuitry changes the setting of the frame for detecting the flash band, based on detection information of a subject in the imaging device.
6. The image correction device according to claim 5, wherein
the detection information of the subject is face detection information of the subject.
7. The image correction device according to claim 1, wherein
the circuitry determines whether or not a flash band correction is to be performed, based on a purpose of use of the video signal.
8. The image correction device according to claim 1, wherein
the circuitry is further configured to output a video signal which has not been corrected by the circuitry to a recording medium.
9. An image correction method performed by an image correction device including circuitry, the image correction method comprising:
detecting, by the circuitry, a flash band, the flash band being a step occurred between levels for respective lines in a frame by a flash of light, the step being occurred by a difference in exposure time between the lines of a video signal output for each frame from pixels included in a rolling shutter image sensor;
identifying, by the circuitry, a frame including an end of the flash band;
outputting, by the circuitry when the flash band has been detected in a current frame, a video signal of a previous frame output from the rolling shutter image sensor earlier than the current frame containing the detected flash band; and
outputting, by the circuitry when the flash band is not detected in the current frame and the current frame is second in order immediately after the identified frame including the end of the flash band, a video signal that is an arithmetic mean of the previous frame and the current frame.

10. An imaging device comprising:
a rolling shutter image sensor; and
circuitry configured to:
  detect a flash band, the flash band being a step occurred between levels for respective lines in a frame by a flash of light, the step being occurred by a difference in exposure time between the lines of a video signal output for each frame from pixels included in the image sensor;
  identify a frame including an end of the flash band;
  correct the flash band, wherein,
    when the circuitry has detected the flash band in a current frame, the circuitry outputs a video signal of a previous frame output from the image sensor earlier than a frame containing the detected flash band, and
    when the flash band is not detected in the current frame and the current frame is second in order immediately after the identified frame including the end of the flash band, the circuitry outputs a video signal that is an arithmetic mean of the previous frame and the current frame.

11. The imaging device according to claim 10, wherein the circuitry is further configured to:
  output a video signal corrected by the circuitry; and
  output a video signal which has not been corrected by the circuitry.

* * * * *